United States Patent
Luciani et al.

(10) Patent No.: US 7,315,963 B2
(45) Date of Patent: Jan. 1, 2008

(54) SYSTEM AND METHOD FOR DETECTING ERRORS IN A NETWORK

(75) Inventors: David Luciani, Tucson, AZ (US); Raymond Anthony James, Tucson, AZ (US); William Henry Travis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/914,836

(22) Filed: Aug. 10, 2004

(65) Prior Publication Data

US 2006/0036906 A1 Feb. 16, 2006

(51) Int. Cl.
*G06F 11/00* (2006.01)

(52) U.S. Cl. ............................................. 714/37; 714/4
(58) Field of Classification Search ................... 714/31, 714/37, 47; 709/224
See application file for complete search history.

(56) References Cited

U.S. PATENT DOCUMENTS

| | | | |
|---|---|---|---|
| 4,380,067 A | 4/1983 | Beardsley et al. ............. 371/11 |
| 5,448,723 A | 9/1995 | Rowett ........................ 395/200 |
| 5,544,304 A | 8/1996 | Carlson et al. ............. 395/182 |
| 6,061,309 A | 5/2000 | Gallo et al. .................... 369/34 |
| 6,147,601 A | 11/2000 | Sandelman et al. ......... 340/506 |
| 6,272,113 B1 | 8/2001 | McIntyre et al. ........... 370/248 |
| 6,343,320 B1* | 1/2002 | Fairchild et al. ............. 709/224 |
| 6,381,218 B1 | 4/2002 | McIntyre et al. ........... 370/245 |
| 6,437,691 B1 | 8/2002 | Sandelman et al. ......... 340/506 |
| 6,462,654 B1 | 10/2002 | Sandelman et al. ......... 340/506 |
| 6,480,759 B1 | 11/2002 | Ostwald et al. ............. 700/245 |
| 6,535,123 B2 | 3/2003 | Sandelman et al. ......... 340/506 |
| 6,813,634 B1* | 11/2004 | Ahmed ........................ 709/224 |
| 7,103,807 B2* | 9/2006 | Bosa et al. .................... 714/43 |
| 2002/0194524 A1 | 12/2002 | Wiley et al. .................... 714/4 |
| 2003/0014693 A1 | 1/2003 | Goodman et al. ............. 714/31 |
| 2005/0050377 A1* | 3/2005 | Chan et al. ..................... 714/4 |

* cited by examiner

*Primary Examiner*—Scott Baderman
*Assistant Examiner*—Kevin D Scarbery
(74) *Attorney, Agent, or Firm*—Hamilton & Terrile, LLP; Stephen A. Terrile

(57) ABSTRACT

A system and method for efficiently and accurately detecting errors in a network is provided. Devices coupled to a network are configured to determine their local network status and transmit their local network status to a centralized location. The centralized location is configured to receive the local network status from each device and provide network status for the entire network. The centralized location is also configured to analyze the collective network status information and report any network errors. The centralized location is further configured to present the information in a format that allows a user of the network to quickly determine the configuration and status of the network (such as a computer generated graphical representation of the network).

7 Claims, 5 Drawing Sheets

| |
|---|
| TIME STAMP 402 |
| DEVICE TYPE/ID 404 |
| VERSION 406 |
| OPERATIONAL STATUS 408 |
| DEGRADED OPERATION 410 |
| DEGRADED FLAGS 412 |
| PRIMARY NETWORK 414 |
| PRIMARY SWITCH 416 |
| SECONDARY NETWORK 418 |
| SECONDARY SWITCH 420 |

Fig. 4A

| CARD 408(a) | CABLE 408(b) | SWITCH 408(c) | OTHER 408(d) |
|---|---|---|---|

Fig. 4B

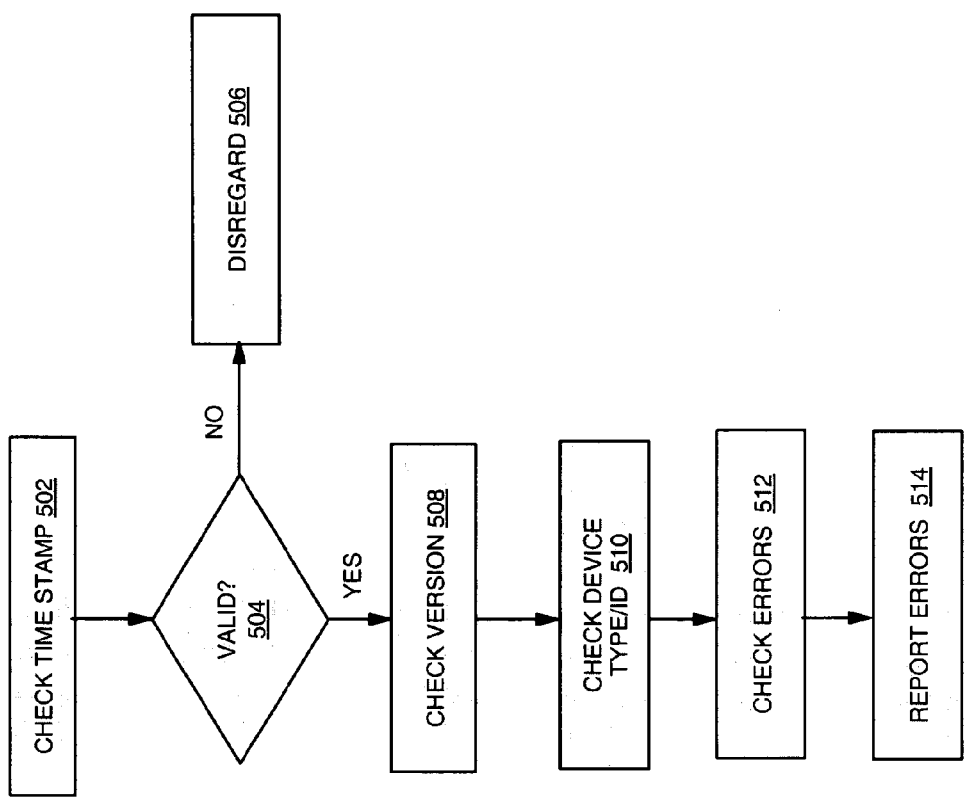

SYSTEM AND METHOD FOR DETECTING ERRORS IN A NETWORK

BACKGROUND

1. Technical Field

The present invention relates to communication networks, and more specifically to a system and method for detecting errors and/or providing communication status in a communication network.

2. Description of the Related Art

A communication network is essentially a group of two or more devices configured to communicate with each other and/or exchange data with each other. The successful operation of a communication network depends on the ability of the devices coupled to the network to communicate with each other without error. If errors do occur, successful operation of the network then depends on the expedient resolution of those errors.

Unfortunately, known techniques of detecting and isolating network errors are not adequate under all circumstances. As an aid to understanding some limitations of known techniques, a diagram of a typical network is provided. FIG. 1 is a block diagram of one type of communication network, an Ethernet network 100. Ethernet network 100 includes a number of hosts 102 attached to each other via communication lines 104 and Ethernet switches 106. In general, when network 100 is operating without errors, each host 102 is able to communicate with each other host 102 via communication lines 104 and switches 106. However, when a network error occurs in network 100, one or more hosts 102 may be unable to communicate with any device on network 100 (e.g., a fatal error), or communication with other hosts may be possible, but occur with interruption and/or decreased efficiency because of the error (e.g., a non fatal error).

As described above, networks are comprised of a number of various components, many operating on various protocols and spanning physical locations including offices, cities, states, and continents. This large number of components spread across various physical locations adds to the difficulty in isolating network errors. For example, network errors can be associated with network interface cards, communication cables, network switches, hosts, and/or other components associated with a network. It is not possible to physically inspect the network and all the associated components, and one must rely on other techniques to diagnose network errors. As used herein, a network error may refer to an error or symptom resulting from a misconfiguration, a hardware failure or a software failure, the impact of which may temporarily or permanently interfere with the communication of any data within and/or through a network at any level of the network (e.g., any level of the Reference Model for Open Systems Interconnection (OSI reference model) or other model).

One shortcoming with existing network diagnostic techniques relates to when the error is first noticed. Generally, a network error goes unnoticed until communication over the network is actually attempted. For example, if a failure were to occur in communication line 104(e), it is likely that the error would go unnoticed by one or more hosts 102 unless an attempt to transmit data over communication line 104(e) was made. Upon attempting communication which involved line 104(e), the attempt would likely result in errors (in this example). Not until such error was realized would the originator of the communication notice the error and request investigation (e.g., by a system administrator). In contrast, if no communication involving communication line 104(e) were attempted, the error in communication line 104(e) might go unnoticed indefinitely. Unfortunately, realizing the error at the time of need (e.g., when communication is attempted) only increases the urgency with which the error must be resolved and the impact of such error (including potentially significant monetary costs).

Another limitation with existing network diagnostic techniques relates to the accessibility of network status information. While many devices coupled to a network provide an error log which can contain a list of errors detected by the device, the errors are generally local to the device and do not include errors associated with other devices on the network. While a system administrator may be able to log on to each host 102 and examine the error log associated with that host 102 (assuming the host is accessible over network 100), the system administrator may not be able to determine the network status of the entire network via a single database of pertinent information. This problem is especially present in heterogeneous networks composed of, for example, hosts having different operating systems and/or communicating via different communication protocols.

Further problems with known network diagnostic techniques include the reliance on manual intervention (i.e., a system administrator) to remotely (or locally) perform network diagnostics. Relying on one to diagnose and analyze network errors can be a time consuming process, which gets more difficult with each resource added to the network. This can result in imprecise diagnoses of the original error. A trial and error approach is often adopted at this point in which resources in the generalized area of failure are replaced, with the hopes that the error is fixed upon hardware replacement and/or reconfiguration. However, such a trial and error approach can fail to identify the underlying cause of the error, and can even introduce additional errors. From another perspective, the original network error may itself preclude remote investigation of certain areas of the network, and one must rely on manual intervention with one in close proximity to the affected component.

Finally, all of the problems above are made more difficult the more complex network 100 becomes. For example, complex storage subsystems can be coupled to network 100. The knowledge associated with troubleshooting errors associated with each subsystem is very detailed and unique. As a consequence, a fewer number of system administrators may be available to detect and diagnose network errors among such complex subsystems.

Many of the deficiencies with known techniques of network error isolation and diagnostics are due, in part, to the inability to detect a network error before communication is attempted, the lack of a centralized network reporting system, and the reliance on manual intervention for isolation/diagnostic purposes. Thus, what is needed is a system and method for the efficient and accurate detection and isolation of errors in a network.

SUMMARY

It has been discovered that by providing a number of devices on a network configured to monitor areas of a network and provide information to a network status device (e.g., a network analyzer), network errors can be efficiently detected and reported. Accordingly, one aspect of the present invention provides a system and method for efficiently and accurately detecting errors in a network. Devices coupled to a network are configured to determine local network status and transmit the local network status to a network analyzer.

The network analyzer is configured to receive the local network status from each device and provide network status for the entire network. The network analyzer is also configured to analyze the collective network status information and report any network errors. The network analyzer is further configured to present the information in a format that allows a user of the network to quickly determine the configuration and status of the network (such as a computer generated graphical representation of the network).

BRIEF DESCRIPTION OF THE DRAWINGS

For a better understanding of the invention, reference should be made to the following detailed description taken in conjunction with the accompanying drawings, in which:

FIG. 4 is a block diagram of an exemplary network status packet in accordance with the present invention; and FIG. 5 is a flow chart illustrating a method of analyzing and reporting network status information in accordance with the present invention.

DETAILED DESCRIPTION

Introduction

The detection and isolation of errors in a communication network is crucial to the successful operation of the network. Accordingly, the present invention provides a system and method for efficiently and accurately detecting errors in a network. Explained in greater detail below and in accordance with the present invention, devices coupled to a network are configured to determine their local network status and transmit their local network status to a network analyzer. The network analyzer is configured to receive the local network status from each device and provide network status for the entire network in accordance with the present invention. The network analyzer is also configured to analyze the collective network status information and report any network errors and/or present the information in a format that allows a user of the network to quickly determine the configuration and status of the network (such as a computer generated graphical representation of the network). The following sets forth a detailed description of the best contemplated mode for carrying out the invention. The headings provided herein are intended for aiding in the description of the present invention and are not intended to limit the scope of the present invention. The description is intended to be illustrative of the invention and should not be taken to be limiting. Rather, the scope of the invention is to be defined by the claims which appear at the end of the description.

An Exemplary Network Employing the Present Invention

Figure 1:
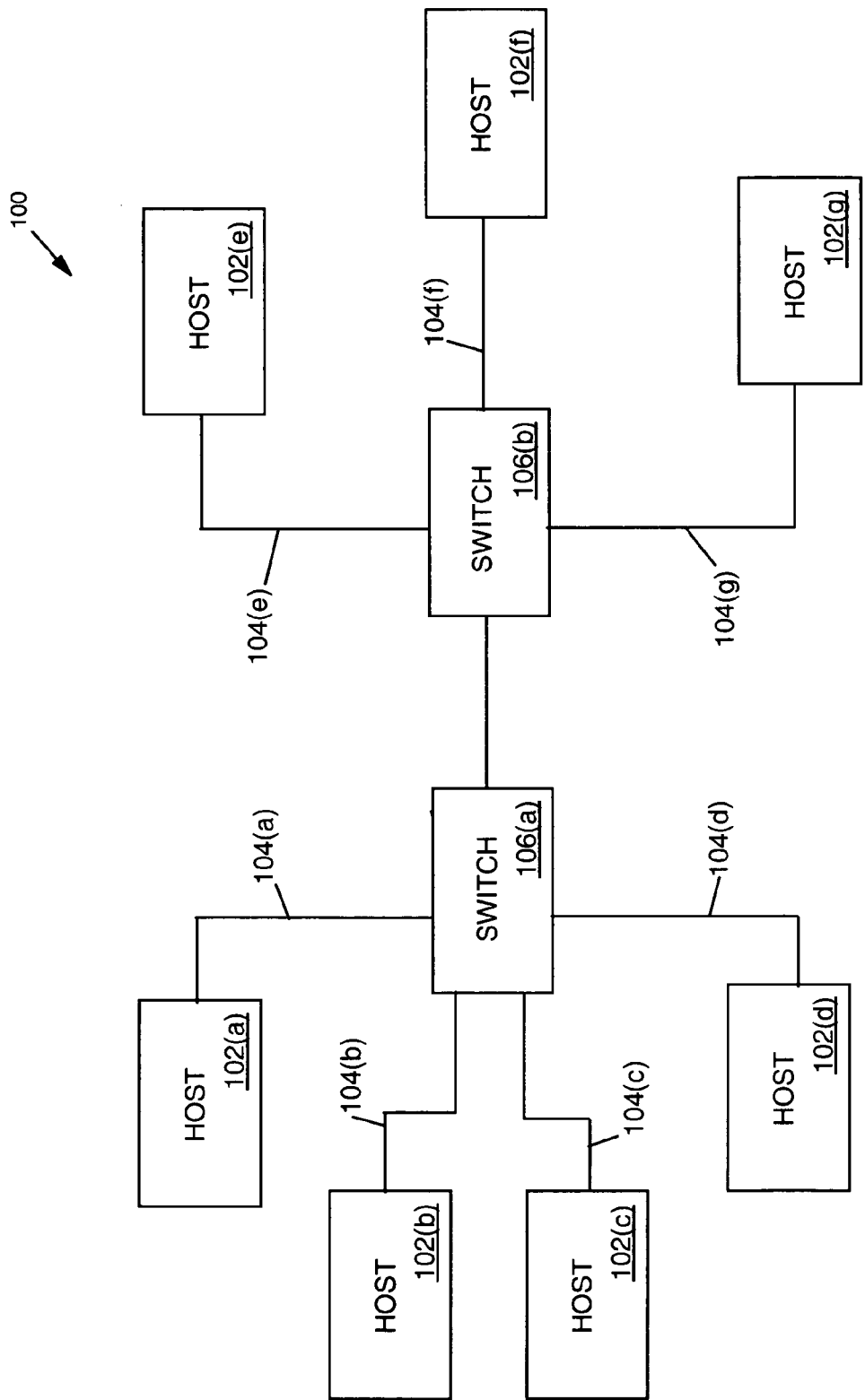
FIG. 1 is a block diagram of an exemplary communication network.
Figure 2:
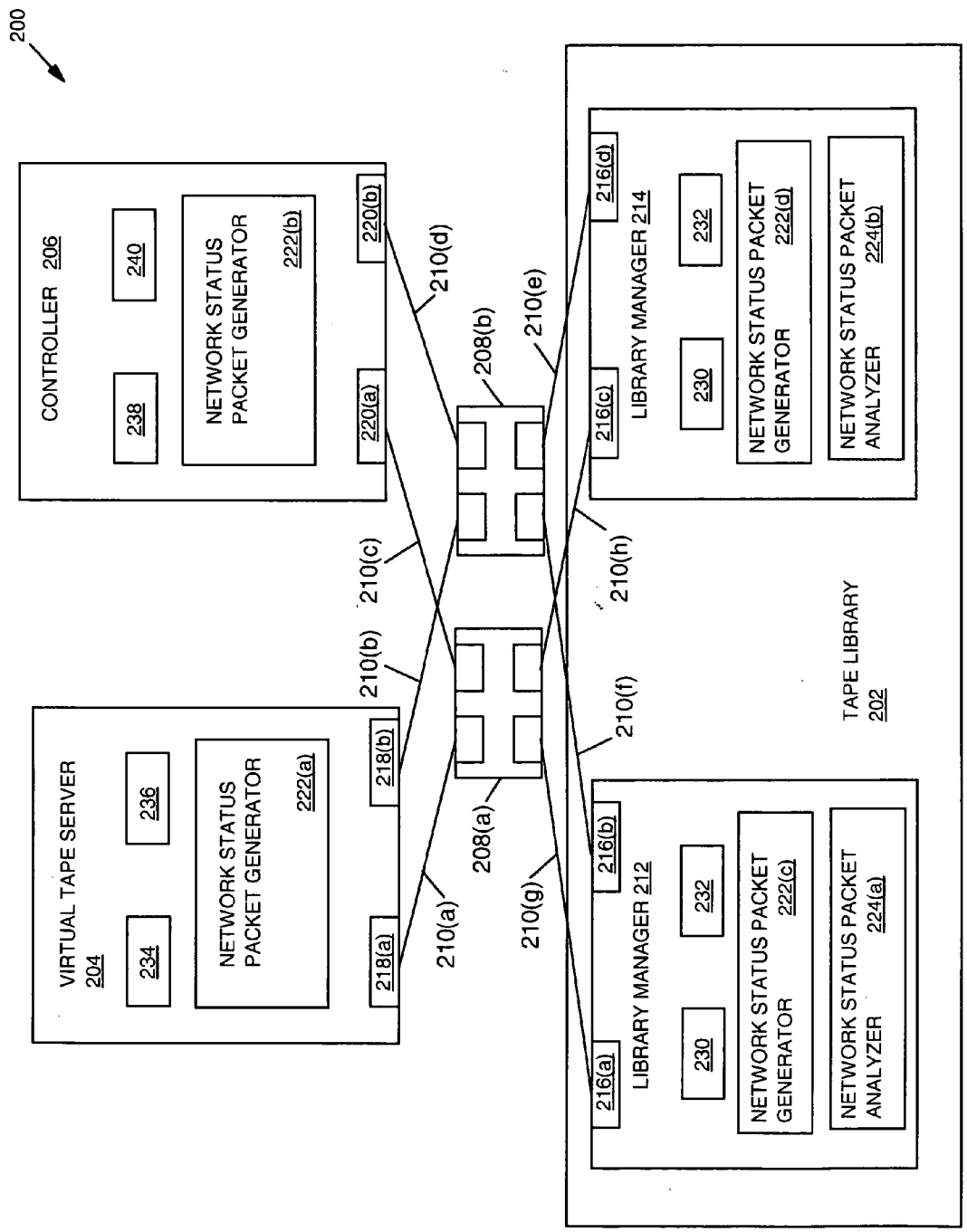
FIG. 2 is a block diagram of a communication network employing one embodiment of the present invention.

FIG. 2 illustrates one type of network employing the present invention, an Ethernet network 200 including a number of storage subsystems. Network 200 includes an automated tape library 202, a virtual tape server 204, and a controller 206. Automated tape library 202, virtual tape server 204, and controller 206 are coupled to each other via Ethernet switches 208 and communication lines 210.

In order to provide a more clear understanding of network 200, a brief description of the components of network 200 is provided. Automated tape library 202 is a storage subsystem designed to automate the retrieval, storage, and control of (as many as thousands of) tape cartridges. Automated tape library 202 includes a cartridge storage facility (not shown) to store the tape cartridges, one or more tape drives (not shown) to read and write data to and from the tape cartridges and one or more robotic assemblies (not shown) to move the tape cartridges within the tape library. One example of automated tape library 202 is an IBM UltraScalable Tape Library.

To assist with and/or control these functions, automated tape library 202 includes library managers 212 and 214. Library managers 212 and 214 control and manage functions of automated tape library 202 (e.g., the inventory of tape cartridges, the functions associated with the robotic assembly, and the like). In the presently described embodiment, two library managers are provided for redundancy. For purposes of explanation, library manager 212 is referred to as the "active" library manager and library manager 214 is referred to as the "standby" library manager. Standby library manager 214 is configured to provide library manager functions in the event active library manager 212 is not available (e.g., because of a failure of active library manager 212).

Each library manager 212 and 214 includes one or more processors 230, memory 232, and network interfaces 216. Processor 230 can be any processor configured to execute computer instructions residing in a tangible storage medium such as a diskette, CD-ROM, memory 232, or other medium capable of storing computer instructions for processor 230. Memory 232 can be in the form of cache, magnetic media, optical media, system memory and/or other type of memory. Network interfaces 216 provide an interface to couple each library manager 212 and 214 to network 200. While in the presently described embodiment network interfaces 216 are designed to interface with an Ethernet network, other networks are contemplated (e.g., token ring, fiber channel, and the like). For clarity, only functions of library manager 212 are described, with the intention that the functions described with respect to library manager 212 apply to library manager 214, unless otherwise noted.

Because of the number of tape cartridges that can exist in tape library 202, it is beneficial to provide a system to efficiently communicate with hosts and also manage the writing of data to and retrieve data from the tape cartridges. Virtual tape server (VTS) 204 is a storage subsystem designed to efficiently communicate with hosts and manage data stored on the tape cartridges of tape library 202. VTS 204 includes one or more processors 234, memory 236, and network interfaces 218. Processors 234 can be any processor configured to execute computer instructions. Memory 236 can be in the form of cache, magnetic media, optical media, system memory and/or other type of memory. Network interfaces 218 couple VTS 204 to network 200. VTS 204 is configured to receive data intended for storage on one or more tape cartridges of tape library 202 and save the data on hard disk drives (or other similar memory) (not shown). VTS 204 efficiently transfers the data from the hard disk drives to tape cartridges, stacking multiple tape volumes on a single cartridge when necessary. VTS 204 can file the cartridges into tape library 202 and/or send the data to additional storage subsystems (not shown) for archiving, disaster recover, and the like.

In addition to VTS 204, tape library 202 can also be coupled to a controller 206. Controller 206 can be used to control and/or manage the functions of tape library 202. Controller 206 includes one or more processors 238, memory 240, and network interfaces 220. Processors 238 can be any processor configured to execute computer instructions. Memory 240 can be in the form of cache, magnetic media, optical media, system memory and/or other type of memory. Network interfaces 220 provide a network connection to controller 206.

To provide network communication redundancy, network 200 includes multiple Ethernet switches 208 and communication lines 210. In general, an Ethernet switch allows each node on a network to communicate with each other node in an efficient manner. The use of more than one Ethernet switch and communication line provides for a backup communication path in case the primary path fails. For example, if switch 208(a) were to fail, communication might still be available via switch 208(b), and vice versa. In the presently described embodiment, switches 208 are Ethernet switches, however, switches 208 can be other network devices designed to switch and/or route network packages, frames, and the like, over network 200.

FIG. 2 is merely illustrative of some of the features and devices of one example of a communication network in which the present invention may be employed, and those having ordinary skill in the art will readily recognize different configurations and features are possible. For example, network 200 can operate on a number of network protocols and/or couple a number of other storage subsystems to network 200. In the presently described embodiment, communication lines 210 are physical Ethernet compatible cables that attached two or more devices. Communication cables 210 are able to transfer data in accordance with the Ethernet protocol.

It is important that network 200 operate without error. It is also important that if errors occur, the errors be detected and resolved quickly and efficiently. Important data (e.g., protocol messages, financial data, business data, etc.) can be transmitted over network 200. The reliability of the transmissions is very important. If any network error were to occur, data can possibly be lost, causing real economic harm. What is more, the down time associated with detecting and fixing the error can also create real economic loss to a business relying on the information contained in network 200. Thus, it is advantageous to provide a system and method to efficiently and accurately detect errors in network 200.

Accordingly, devices on network 200 are configured with a network status packet generator 222. Explained in more detail below, network status packet generator 222 is configured to determine the operational status and communication status of a subset of network 200 and transmit the information to a network status packet analyzer 224(a) of active library manager 212. Network status packet analyzer 224 is configured to analyze the information received from each network status packet generator 222 and report any errors that may be present in network 200.

In one embodiment of the present invention, network status packet generator 222 and network status packet analyzer 224 take the form of computer executable instructions which reside on computer readable media. For example, network status packet generator 222(a) takes the form of instructions which reside on memory 236 and can be executed by processor 234. Network status packet generator 222(b) takes the form of instructions which reside on memory 240 and can be executed by processor 238. Network status packet generators 222(c) reside on memory 232 and can be executed by processors 230. In other embodiments the computer readable media on which the instructions reside are one or more of cache, non-volatile memory, registers, diskette, magnetic media, optical media, and/or signal bearing media such as a signal transmitted over a physical or wireless communication medium. Also in other embodiments, the instructions may reside on a single computer readable media, or be divided up so that some instructions reside in one form and other instructions reside in another form (e.g., as part of an operating system and as part of microcode).

Generating a Network Status Packet

Figure 3:
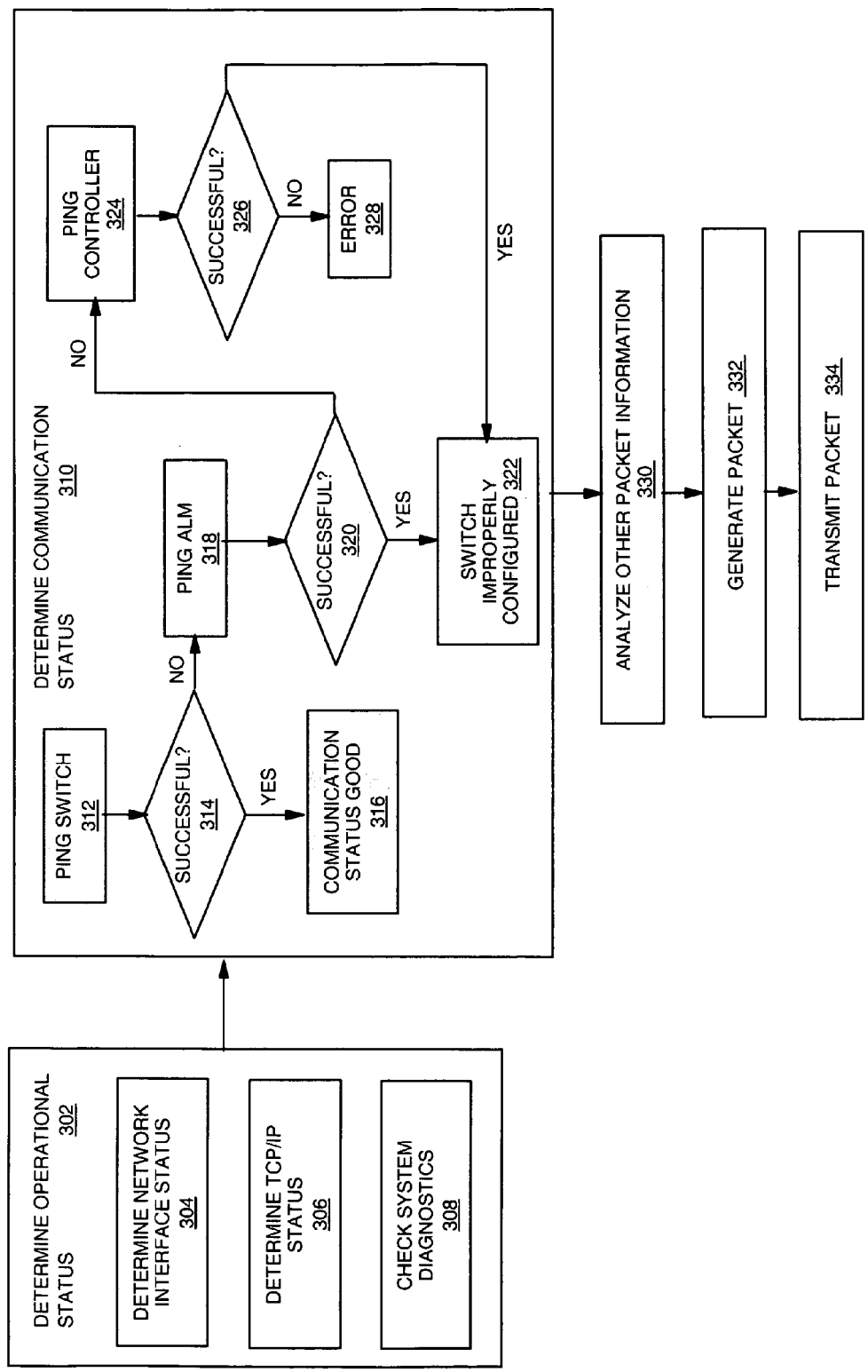
FIG. 3 is a flow chart illustrating a method of generating a network status packet in accordance with the present invention.

FIG. 3 is a flow chart 300 illustrating one technique utilized by network status packet generator 222 to generate a network status packet in accordance with the present invention. As described in FIG. 2, network status packet generator 222 is included in a number of devices. For brevity and clarity, the operations of flow chart 300 are described with respect to VTS 204. It is recognized that similar, if not the same, operations apply to all other devices of network 200 (e.g., controller 206), unless otherwise noted.

Initially in operation 302, network status packet generator 222(a) determines the operational status of VTS 204. In the presently described embodiment, determining the operational status includes determining the status of network interfaces (operation 304), determining the status of the TCP/IP stack (operation 306), and checking the overall system for errors (operation 308).

In operation 304, determining the status of the network interface can be accomplished any number of ways, including performing system diagnostics on network interface cards 218 included in VTS 204, attempting communication (e.g., via one or more "pings") over network interface cards 218 and examining the results, and so on. In operation 308, checking the overall system for errors can be accomplished by performing system level or application specific diagnostics, examining error logs, and/or checking information gathered by a service processor (not shown) associated with VTS 204. For example, a service processor of VTS 204 can be configured to monitor the status of network interface card 218, determine if communication line 210 has been detached from network interface card 218, and the like. Network status packet generator 222(a) can then query the service processor to determine this information. Following completion of operation 302, network status packet generator 222(a) knows, at least, whether network interface cards 218 of VTS 204 are operational or not, whether the TCP/IP stack of VTS 204 is operational or not, and whether there are other errors that interfere with the operational status (from a network communication point of view) of VTS 204.

In operation 310, network status packet generator 222(a) determines the communication status of VTS 204. In the presently described embodiment, operation 310 is accomplished by pinging devices coupled to VTS 204. The pings can be broadcast pings, multicast pings and/or point-to-point pings. The presently described embodiment utilizes point-to-point pings. Point-to-point pings reduce the amount of traffic on network 200 and are more secure than other type pings.

In operation 312, VTS 204 pings switch 208(a) (switch 208(a) is the switch configured to handle the primary communication path for network 200) (operation 312). If the ping is successful, then the communication status of VTS 204 is determined to be functioning correctly ("Yes" branch of decision block 314, and operation 316). However, if the ping to switch 208(a) is not successful, then further pings are attempted ("No" branch of decision block 314). If not able to ping switch 208(a) following additional pings, VTS 204 attempts to ping active library manager 212 (operation 318).

If the ping to active library manager 212 is successful, then it is determined that switch 208(a) is not properly configured ("Yes" branch of decision block 320 and operation 322). If, however, the ping to active library manager 212 is not successful, then VTS 204 attempts to ping controller 206 ("No" branch of decision block 320 and operation 324). If the ping to controller 206 is successful, then it is determined that switch 208(a) is not properly configured ("Yes" branch of decision block 326 and operation 322). If, however, the ping to controller 206 is not successful, then it is determined there is an error with either a network interface card 218 of VTS 204, a communication line 210 attached to network interface card 218, and/or switch 208(a) ("No" branch of decision block 326 and operation 328). VTS 204 performs necessary operations 312-328 for the secondary communication path through switch 208(b) as well. Following operation 310, network status packet generator 222(a) knows the communication status (e.g., successful or not) of both the primary network path and the secondary network path (e.g., the primary network path is through switch 208(a) while the secondary network path is through switch 208(b)). If the communication status of either of the network path's is not successful, then it is determined that possible causes of error include network interface card 218 of VTS 204, a communication cable 210 connected to the network interface card, and/or an improperly configured switch.

Once the operational and communication status of VTS 204 have been obtained, network status packet generator 222(a) of VTS 204 is configured to provide the information in a network status packet (e.g., network status packet 400, described below), and transmit the network status packet information to all other devices 212, 206 and 214 on network 200. Each device may then use the information to more accurately determine the status of its area of network 200. For example, network status packet generator 222(c) transmits information it gathered from its area of the network to all other network status packet generators 222 on network 200. The respective network status packet generators 222 may utilize the information from network status packet generator 222(c) to more accurately determine their own network status. To accomplish this, network status packet generator 222(a) compares information it generated with information received from network status packet generator 222(c) (operation 330).

As an example of how this comparison is helpful, assume a network error exists in network 200. If VTS 204 is not able to ping switch 208(a) but library manager 212 is able to ping switch, then it is less probable that switch 208(a) itself is the cause of the error. Network status packet generator 222(a) can use this realization (information) to provide better precision as to the cause of the error. Once the operational status and the communication status of VTS 204 is known, network status packet generator 222(a) generates a network status packet (e.g., packet 500 of FIG. 5) (operation 332) and transmits the network status packet to network status packet analyzer 224(a) (operation 334).

The operations of flow chart 300 are performed periodically by each network status packet generator 222 of network 200. In one embodiment of the present invention, the events are repeated every two minutes. For example, every two minutes each network status packet generator 222 is configured to determine the operational and communication status as described above, generate the corresponding network status packet (described below), and transmit the network status packet to devices on network 200, including network status packet analyzer 224. A more or less frequent period than two minutes can be used, taking into consideration the number of devices on the network, and the amount of bandwidth consumed by the transmission of status packets.

An Exemplary Network Packet

FIG. 4A illustrates an exemplary network status packet 400 generated by network status packet generator 222 in accordance with the present invention. Network status packet 400 includes time stamp field 402, a device type/id field 404, a version field 406, an operational status field 408, a degraded operation field 410, a degraded flags field 412, a primary network field 414, a primary switch field 416, a secondary network field 418, and a secondary switch field 420. In the presently described embodiment, degraded operation field 410, degraded flags field 412, primary network field 414, primary switch field 416, secondary network field 418 and secondary switch field 420 represent a communication field of network status packet 400. However, in other embodiments of the present invention, the communication field of network status packet 400 may include additional or fewer fields than shown in FIG. 4B which represent the communication functions of a device.

In the presently described embodiment, time stamp field 402 includes a time at which generation of network status packet 400 is complete. Alternatively, time stamp field 402 can include the time that network status packet 400 was transmitted by network status packet generator 222. Device type/id field 404 includes a unique identifier of the device for which network status packet 400 was generated (e.g., VTS 204, controller 206, active library manager 212, and the like). Version field 406 identifies the version of network status packet 400. The version of network status packet 400 allows for modifications to network status packet 400 to occur. For example, a first version of network status packet 400 may include the fields as shown in FIG. 4A. However a second version of network status packet 400 may include a larger or smaller number of fields. A system analyzing network status packet 400 would know which fields were present based on version field 406.

Operational status field 408 indicates a possible network error (described in more detail in FIG. 4B). Degraded operation field 410 indicates whether or not the device is operating in degraded mode. Degraded operation field 410 is set to true if an error is indicated in operational status field 408 or if the device itself has experienced non-network related errors. Degraded flags field 412 provides additional diagnostic information if degraded operation field 410 is true and is specific to non-network related errors. Primary network field 414 is true if the device is able to communicate over the primary network, and false otherwise.

In the presently described embodiment, a device is able to communicate over the primary network if the device is able to communicate with another device coupled to the primary switch. For example, referring to FIG. 2, the primary switch is 208(a). If VTS 204 is able to communicate with controller 206 via switch 208(a), then it is determined that VTS 204 is able to communicate over the primary network. In such a case, primary switch field 416 is true.

In the presently described embodiment, network status packet 400 is a data structure stored on computer readable memory (e.g., floppy disk, random access memory, non-volatile memory, a hard disk drive, magnetic media, optical media, and the like). Network status packet 400 can also be stored and/or transmitted in signal bearing media such as over a network communication line. Each field of network status packet can be any number of bits long. In the presently described embodiment, fields 402, 404, 406, 408, 410, and 412 are each 8 bits long. Fields 414, 416, 418, and 420 are each 1 bit in length. However, in other embodiments, each field may be larger or smaller in size so long as the appropriate information is conveyed. Further, it is not necessary that each field be of the same size. In the presently described embodiment, a true is represented with a bit setting of 1 (logic high), a false is represented with a bit setting of 0 (logic low).

FIG. 4B illustrates the sub-fields of operational status field 408. The sub-fields of operational status field 408 are used to identify possible errors with respect to the network resources of a given device. For example, sub-field 408(a) indicates whether an error has been detected related to one or more network interface cards of the device. Sub-field 408(b) indicates whether an error has been detected related to one or more communication lines coupled (and/or not coupled) to the network interface cards of the device. Sub-field 408(c) indicates whether an error (and/or misconfiguration) has been identified for one or more switches coupled to the device. Sub-field 408(d) is used to indicate whether an error has been identified, but is not associated with the network interface card, the communication cable, and the switch.

In the presently described embodiment, each sub-field is multiple bits in length. Accordingly, the sub-field can be used to indicate not just whether an error has been identified, but can also provide information about the error. For example, sub-field 408(b) can indicate whether an error exists with respect to the communication line, and whether the cable is attached or not attached to the network interface card (as sensed by the network interface card.)

Analyzing Network Status Packets

As described above, each network status packet generator 222 is configured to determine the network status of a particular subset of network 200 and provide a network status packet (e.g., network status packet 400) to a network packet analyzer. For example, network status packet generator 222(a) is configured to determine the status of virtual tape server 204 including interfaces 218, communication lines 210(a) and (b), and switches 208(a) and (b), generate a network status packet containing the status, and transmit the network status to a network packet analyzer. Network status packet generator 222(b) is configured to determine the status of controller 206 including interfaces 220, communication lines 210(c) and (d) and switches 208(a) and (b), generate a network status packet containing the status, and transmit the network status to a network packet analyzer. Network status packet generator 222(c) is configured to determine the status of tape library 202, communication lines 210(f) and (g), switches 208(a) and (b), and interfaces 218 and 220, generate a network status packet containing the status, and transmit the network status to a network packet analyzer.

Dividing (or segregating) the network into areas has a number of advantages. For example, the work load associated with determining status for the entire network is distributed to each network packet generator coupled to the network. Additionally, while an error associated with the network may preclude one network packet generator from providing status, it may be possible for the other network packet generator to continue to provide status. This might not be so if the work of gathering network status was assigned to a single system and a network error precluded that single system from communicating with the network.

Further advantages include the ability to account for various devices coupled to the network, with each device possibly having different communication interfaces and/or protocols. For example, by segregating the network to provide status, in accordance with the present invention, each network packet generator can be independently tailored to communicate with various devices using different protocols. Because each network packet generator is further configured to generate a similar network status packet (e.g., similar in that each has a similar data structure), the different protocols, distance, and functions of the devices on the network can be made transparent to the network packet analyzer.

Once the status for each device on network 200 has been determined by each respective network status packet generator 222, a network status packet (e.g., network status packet 400) is generated and transmitted to at least one network status packet analyzer 224. In the presently described embodiment, network status packets analyzer 224 is included in active library manager 212. In other embodiments, network status packet analyzer 224 can be included in VTS 204 and/or controller 206 and/or any other node that can be included in network 200 (e.g., a storage controller).

A device associated with network status packet analyzer 224 receives each of the network status packets and stores the packets in a memory. The packets can be stored any number of ways. For example, the packets can be stored as a linked list, combined into a single data structure, a mailbox configuration, and so on. In the presently described embodiment, the network status packets are stored as a dual linked list, with each network status packet containing a memory pointer to the previous network status packet and the following network status packet. Because each generator of each device transmits a packet periodically, the information in the linked list for the packet is updated accordingly. Determining communication of the network then involves the analyzer traversing the linked list, examining each associated packet in the list for indication of errors, comparing information in a number of packets to further isolate or identify any errors, and reporting the resulting information. A more detailed description of one example of such a technique is provided below.

FIG. 5 is a flow chart 500 illustrating a technique utilized by network status packet analyzer 224 to analyze network status packets and identify network errors in accordance with the present invention. In analyzing network status packets, network status packet analyzer attempts to determine status of the entire network 200. It is apparent that care must be given not to falsely report any errors. One common situation that may trigger a false error report is purposefully taking a device off-line. For example, if a device containing a network packet status generator 222 is purposefully taken off-line, the device is (more than likely) not able to communicate with the network (although some devices may utilize a service processor to communicate with a network). Similarly, however, if a device is affected by a critical network failure, the device may not be able to communicate with any part of the network. Thus, there is a need to account for a situation of purposefully taking a device off-line and the situation of network failures associated with the device.

A timing scheme is used to account for such circumstances in the presently described embodiment. In the timing scheme, a time stamp is assigned to each network status packet by each network status packet generator 222, as described with respect to FIG. 4. As network status packet analyzer 224 checks each packet, network status packet analyzer 224 checks the time stamp of the packet to determine if the packet (and the information contained therein) is valid or invalid (e.g., whether or not the data in the network status packet should be relied upon) (operation 502). (As used herein, to check a value means to read and/or compare the bit settings of the value.) A network status packet is determined "invalid" if the difference between the time stamp in the network status packet and the time at which network status packet analyzer 224 checks the time stamp is greater than a predetermined time (e.g., two minutes). In other words, network status packet analyzer 224 expected a packet within a predetermined time (two minutes), and one was not received. Under such circumstances, the "current" network status packet being analyzed by the network status packet analyzer is considered "stale" and is not relied upon for pinpointing errors. In the least, it can be determined that the device associated with the packet was not able to transmit a new packet within the predetermined time either because the device associated with the packet was taken offline, or because a network failure occurred such that the packet could not be transmitted over the primary path and the secondary path to the analyzer. Accordingly, network status packet analyzer 224 identifies the device associated with the packet as "off-line" (either because of a power-off or critical failure).

Analyzer 224 then checks and utilizes information from other packets in the list (e.g., of other devices) to help isolate any errors, as described below. These actions are reflected by the "No" branch of decision block 504 and operation 506. In another embodiment, however, rather than reporting the device as off-line, all possible errors can be reported for the device (e.g., network interface, communication cable, and the TCP/IP stack).

If, however, the network status packet is determined to be valid (i.e., the packet was received within the predetermined time), then the version is checked (operation 508). The version of a network status packet allows for modifications of the network status packet 400. For example, a first version of the network status packet may include the fields as shown in FIG. 4A. However, a second version of network status packet may include more or fewer fields. Network packet status analyzer 224 knows which fields are present in the packet based on the version.

In operation 510, the device id and device type of the system for which the packet was generated is checked. The device id and device type provide information that uniquely identifies the device. In the presently described embodiment, the device type corresponds to the model number of the device and the device id corresponds to a unique serial number for the device. While the presently described embodiment utilizes a device type and a device id to provide this information, the same information can be provided using more or less identifiers (e.g., a serial number). For example, such information allows for determination that system 204 is a virtual tape server, system 206 is a controller, system 212 is a library manager and system 214 is also a library manager.

In operation 512, fields 408 through 420 of the network status packet are each checked to determine if any errors have been discovered for a particular device. In the present embodiment, network status packet analyzer reads each value associated with fields 408-420 and compares each value to a logic "1". If a logic "1" is present, analyzer 224 concludes that a network error has been identified. For example, if one or more bits in field 408(a) are set to logic "1", then it is determined that a card error exits in the device associated with the packet.

In addition to checking each packet for bit settings indicating errors, network status packet analyzer 224 compares the information contained in each packet with the information contained in each other packet to help isolate the error and/or to assign an probability that an error is associated with a certain device. For example, since both VTS 204 and controller 206 "monitor" switch 208(a), each will have status information for switch 208(a). A probability of error can be assigned to switch 208(a) based on the collection of information. If both VTS 204 and controller 206 report no error, then the probability of error can be set to zero. If one reports an error, and another does not, then the probability that the switch is in error can be 50%, if both systems report an error, than the probability of error can be 100%.

Following examination of the packets and determination of possible errors, the errors are reported, operation 514. Reporting the error(s) can be accomplished any number of ways. For example, one method of reporting the errors can include automatically initiating a notification (e.g., telephone call, page, e-mail, and/or the like) to a system administrator responsible for monitoring network 200. The notification can include a reference to the specific type of error detected (e.g., the network interface card for the virtual tape server has failed, as determined from fields 404 and 408 of the packet). Armed with this information, the system administrator can obtain a replacement network interface card, travel to (or ship the card to) the appropriate location where the failed card can be replaced.

Another method of reporting the error can include generating a logical graphical representation of the network based on the information in the packets. For example, information in the packets identifies the types of systems that are coupled to the network and the status of the communication paths there between. Network packet status analyzer 224 can utilize this information to generate a logical representation of the various components and connections. Identifiers can then be used to pinpoint any errors. For example, a failed component can be represented in red, while an off-line device can be represented with faded or dashed lines. A system administrator could log into a system associated with network packet status analyzer and view the status of the entire network. The information could also be formatted for presentation on the internet (e.g., HTML, XML, and/or any other World Wide Web enabled language).

The flowcharts described herein are illustrative of the broad logical flow of steps to achieve a method of the present invention and that steps may be added to, or taken away from the flowchart without departing from the scope of the invention. Further, the order of execution of steps in the flowcharts may be changed without departing from the scope of the invention. Additional considerations in implementing the method described by the flowchart may dictate changes in the selection and order of steps.

In general, the flowcharts in this specification include one or more steps performed by software routines executing in a computer system. The routines may be implemented by any means as is known in the art. For example, any number of computer programming languages, such as Java, "C", Pascal, FORTRAN, assembly language, etc., may be used. Further, various programming approaches such as procedural, object oriented or artificial intelligence techniques may be employed.

ALTERNATIVE EMBODIMENTS

Although preferred embodiments are disclosed herein, many variations are possible which remain within the concept, scope, and spirit of the invention, and these variations would become clear to those skilled in the art after perusal of this document. For example network 200 can include only one Ethernet switch 208 and one communication path for each node on network 200. Network status packet analyzer can be included as a separate device on network 200 or included in one or more devices of network 200. Furthermore, it will be appreciated that devices 204, 206, 212 and 214 need not be as described and identified herein, but may be any device (e.g., a router, switch, network storage device, and the like) capable of being connected to a network and having a network status packet generator and/or a network status packet analyzer as described herein.

What is claimed is:

1. A system comprising:
   a processor;
   a memory coupled to said processor;
   a network interface coupled to said processor to couple said system to a network; and
   a network status packet analyzer coupled to said processor and said network interface, said network status packet analyzer configured to
   analyze a plurality of network status packets received from one or more network status packet generators coupled to said network and determine a status for said network;
   analyze a communication status field and an operational status field of each network status packet to determine whether errors affect a system associated with said network status packet; and,
   compare each field of said network status packet with a corresponding field of each other network status packet and provide a probability that a network error is associated with a component within said network.

2. The system of claim 1 wherein said network status packet analyzer is further configured to:
   compare a value in a time stamp field of a network status packet to a predetermined time; and
   if the difference between the value and the predetermined time is greater than a predetermined limit, said network status packet analyzer is further configured to identify a device associated with said network status packet as offline.

3. The system of claim 1 wherein said network status packet analyzer is further configured to:
   analyze a plurality of network status packets received from one or more network status packet generators coupled to said network and determine a status for said network.

4. The system of claim 1, further comprising:
   a network status packet generator, said network status packet generator configured to determine an operational status of said system;
   determine a communication status of said system;
   generate a network status packet including said operational status and said communication status; and
   transmit said network status packet to said network status packet analyzer.

5. A computer program product comprising instructions for providing a status for a network, said instructions residing on a tangible storage medium and capable of execution by a processor in a system, said computer program product configured to:
   analyze a communication status field and an operational status field of a plurality of network status packets;
   determine whether errors affect a system associated with said network status packet;
   compare each field of said network status packet with a corresponding field of each other network status packet; and
   provide a probability that a network error is associated with a component within said network.

6. The computer program product of claim 5, further configured to:
   compare a value in a time stamp field of a network status packet to a predetermined time; and
   if the difference between the value and the predetermined time is greater than a predetermined limit, identify a device associated with said network status packet as offline.

7. The computer program product of claim 5, further configured to analyze a plurality of network status packets received from one or more network status packet generators coupled to said network and determine a status for said network.

* * * * *